United States Patent [19]

Jonnes

[11] Patent Number: 4,475,629
[45] Date of Patent: Oct. 9, 1984

[54] METHOD AND APPARATUS FOR SELECTIVELY METERING AND SPREADING LUBRICANT IN A CONDUIT

[75] Inventor: Nelson Jonnes, Stillwater, Minn.
[73] Assignee: American Polywater Corporation, Stillwater, Minn.
[21] Appl. No.: 445,469
[22] Filed: Nov. 30, 1982
[51] Int. Cl.³ .............................. F16N 1/00; F16N 9/00
[52] U.S. Cl. .................................. 184/15.1; 118/205
[58] Field of Search ................ 184/15.1; 29/433; 118/205

[56] References Cited

U.S. PATENT DOCUMENTS

| | | | |
|---|---|---|---|
| 3,605,251 | 9/1971 | Salerno et al. | 29/433 |
| 3,605,947 | 9/1971 | Salerno et al. | 184/15.1 |
| 3,858,687 | 1/1975 | Masarky et al. | 184/15.1 |
| 4,108,279 | 8/1978 | Marcell | 184/15.1 |
| 4,137,623 | 2/1979 | Taylor | 184/15.1 X |
| 4,275,096 | 6/1981 | Taylor | 184/15.1 X |
| 4,296,837 | 10/1981 | Charlton | 184/15.1 |

Primary Examiner—David H. Brown
Attorney, Agent, or Firm—Merchant, Gould, Smith, Edell, Welter & Schmidt

[57] ABSTRACT

An improved method and apparatus for proportionately metering and selectively applying lubricant to the inner surface of a conduit as a function of the conduit curvature, to facilitate subsequent pulling of cables therethrough, is disclosed. A spreading device, when pulled through "straight" conduit sections, meters and applies lubricant in longitudinally extending spaced strips of uniform thickness around the inner circumference of the conduit. Upon approaching a curvature or bend in the conduit, pulling tension force vectors transmitted to the spreading device in the radial direction tilt the spreading device to non-concentric alignment in the conduit, causing the spreader to disproportionately apply increased quantities of lubricant to that surface of the conduit having a shorter bend radius, where such lubricant is most needed to reduce frictional sidewall forces applied to the pulled cables. When tilted, the spreader simultaneously reduces the amount of lubricant applied to the conduit wall having the longer bend radius, where such lubricant is needed least. The spreading device is of symmetrical construction, having a frusto-conical forward section, a cylindrical trailing portion and a plurality of inclined rib members that perform the lubricant metering functions. The spreader device is sized and configured to provide the desired lubricant application functions. Use of the spreading device and method of this invention enables accurate predictions to be made on the volume of lubricant that will be needed to fully complete a conduit lubrication application, even over conduits of extended length and having multiple curvatures and bends.

36 Claims, 9 Drawing Figures

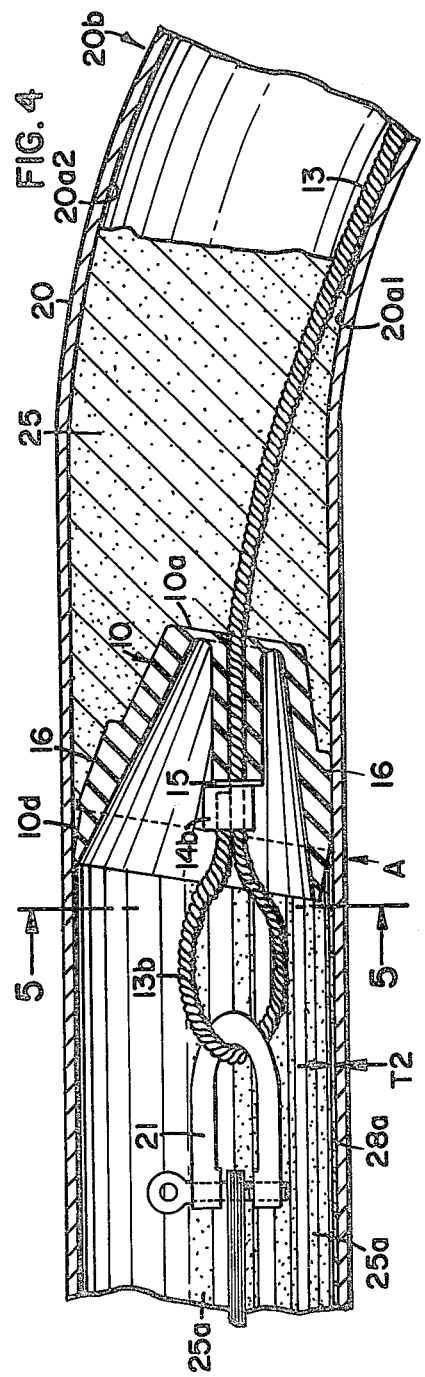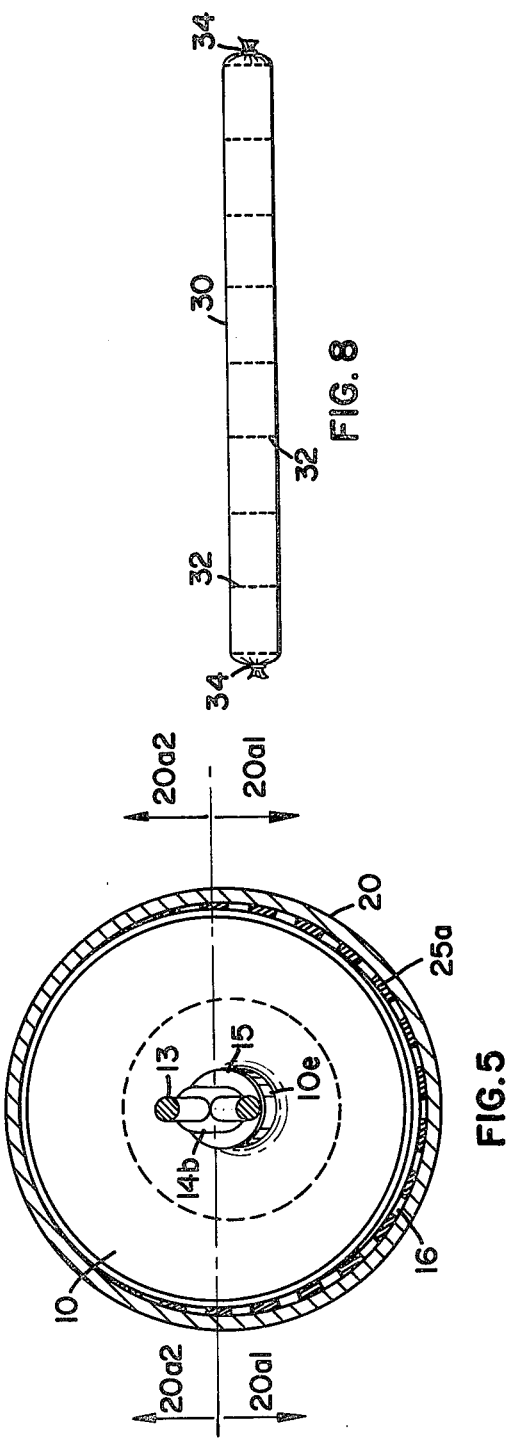

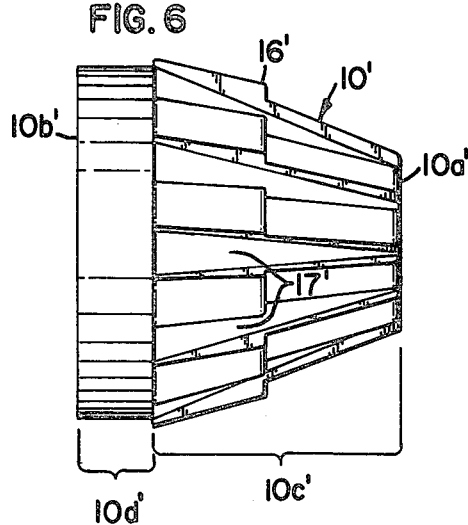
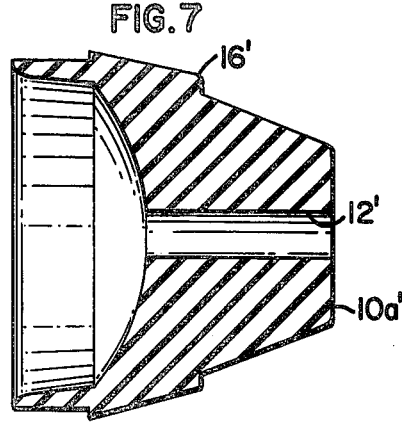
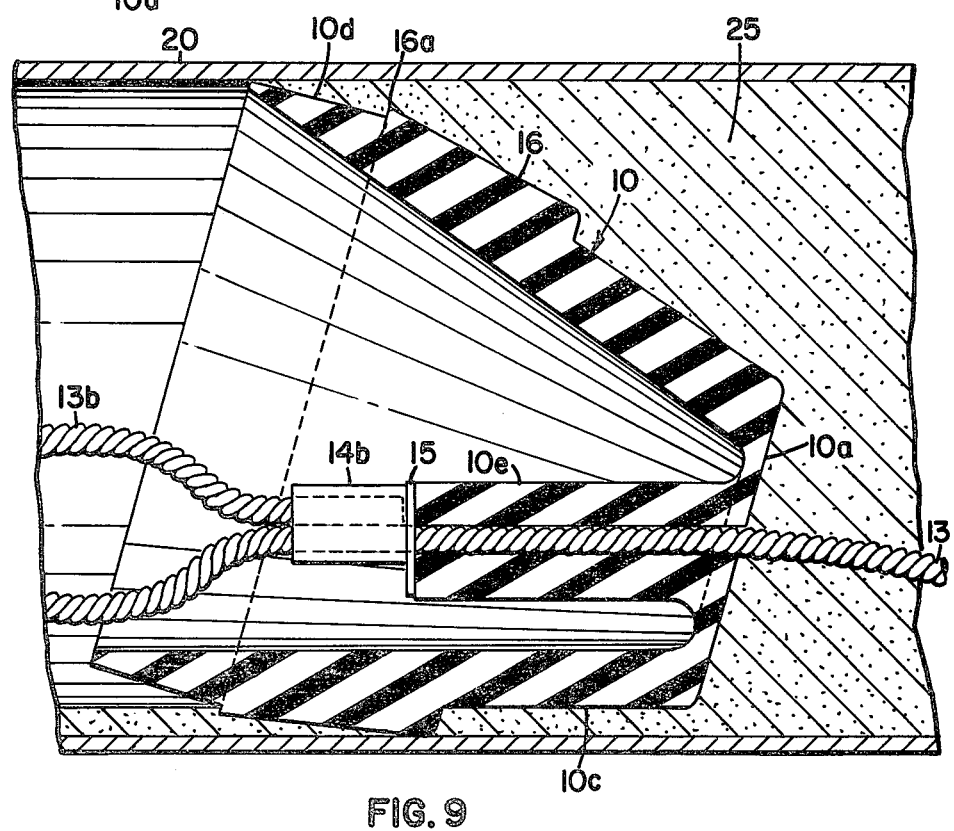

METHOD AND APPARATUS FOR SELECTIVELY METERING AND SPREADING LUBRICANT IN A CONDUIT

TECHNICAL FIELD

This invention relates generally to the field of pulling electrical cables through conduit housings, and more particularly to a method and apparatus for proportionately metering and selectively applying lubricant to the inner surfaces of a conduit, to facilitate subsequent pulling of the cables therethrough.

BACKGROUND OF THE INVENTION

The electrical wires and cables of most commercial and industrial installations are encased within a rigid protective sheath or conduit. In such installations the conduit is generally installed first by laying it out and extending it along predetermined paths from an inlet power source station to outlet junction or power distribution boxes or plugs. Such conduit paths can be very diverse, extending within and through walls, ceilings and floors, and around numerous bends and angles. Similarly, modern day telephone and electric power distribution lines are now typically encased within rigid conduits buried deep within the ground and often extending for thousands of feet between access ports or terminals.

Electrical cables or wires are then installed within the empty conduits by first feeding or pushing a semi-rigid/flexible pull strand commonly referred to as a fishtape, through the conduit, from its inlet source to an outlet box or distribution terminal. The trailing end of the pull strand or fishtape is then secured to one end of the electrical cable(s) to be pulled through the conduit, and the leading end of the pull strand or fishtape is manually or mechanically pulled so as to advance the electrical cable(s) through the conduit. In large conduit installations, wherein a number of thick electrical cables are to be pulled through the conduit, the pull strand typically comprises a multi-strand steel cable or polyester fiber rope capable of withstanding thousands of pounds of pulling tension. Such pull strand winch lines are typically connected to large pulling winches mounted adjacent the conduit outlet.

Whether the application is related to a small electrical contractor pulling wires within one-half inch or one inch conduits for residential or commercial buildings, to a telephone company pulling hundreds of wires through $3\frac{1}{2}$ inch diameter conduits extending over 1,000 foot runs, or to a large commercial contractor pulling large power cables through 5 inch conduits in a nuclear power plant installation, the problems associated with such electrical cable or wire pulling through conduits are universal throughout the electrical industry. The frictional drag forces created between the outer walls of the electrical cables being pulled and the inner surface of the conduit through which they are being pulled, creates a pulling "tension" in the electrical wire that defines the limits on the length of any single pull and the total angle of bends through which the cable may be pulled. The pulling tension created by pulling a wire through a straight conduit segment is generally linearly proportional to the coefficient of friction between the wire and conduit, and the length of the conduit segment. However, the pulling tension forces required to pull the same wire through a bend in the conduit, increase exponentially. Therefore, every bend in the conduit through which the electrical cables must be pulled significantly increases the pulling tension forces applied to the wire and places severe limitations on the entire process. To further complicate matters, crude conduit bending techniques that often exist in smaller installations may result in distortions to the cross-sectional shape of the conduit at a bend radius, causing a restrictive cross-sectional area through which the cable must pass, exactly at that point in the conduit run which already significantly contributes to higher pulling tension forces. In larger conduit installations (e.g. 5 inch conduits), it is not uncommon to experience pulling tension forces of several thousand pounds.

It is obviously desirable to minimize such tension forces that are exerted on the electrical cables and wires during a pulling operation. Severe pulling tension forces can be damaging to the electrical wire in several respects. Industry standards specify the maximum "sidewall" stress that can be applied to an electrical cable during a pulling operation, before damage to the protective coating or insulation of the wire will ensue. When pulling wires of smaller diameter, excessive pulling tension can actually result in stretching of the wire, unevenly reducing the wire diameter at the stretch point, increasing the electrical resistance of the wire and causing unsafe hot spots in the wire at those locations. In large installations, tension pulling forces are often monitored with a dynamometer to insure that the maximum pulling tension specifications are not being exceeded. The consequences of a cable getting "stuck" within a conduit are generally catastrophic. Occasionally, the lodging forces are so extreme that the cable cannot be dislodged by pulling it backward through the conduit. In some instances, the entire conduit run must generally be removed or dug up if buried. In the case of a nuclear power plant, for example, wherein the conduits are permanently embedded within many feet of concrete, a stuck cable can be extremely costly.

To reduce the pulling tension forces required to pull electrical cables through a conduit, lubricants have been applied to the electrical wires as they enter the conduit. Such lubricants have typically been either in the form of a slippery gel or of a pourable nature. The simplest technique for applying the lubricant to the electrical cable is often performed manually by a person simply smearing the lubricant gel onto the cable(s) as it enters the conduit. More complex and costly techniques such as disclosed in U.S. Pat. No. 4,296,837 to Charlton, that sprays a lubricant onto the progressing cable from a collar mounted at the inlet of the conduit, have also been devised. Such techniques, however, are generally too costly and complex to be practical to the contractor who must deal with diverse conduit sizes and environmental obstacles which preclude the use of such complex equipment. Frequently, such direct application to the electrical cable(s) is not adequate when used by itself for cable pulls of extended lengths or for those conduits having multiple bends. Most of the lubricant applied to the cables is deposited on the inner walls of the conduit near the inlet to the conduit, and little lubricant remains on the cable surface where it is most needed, at a location further down the conduit, and at bends in the conduit.

Accordingly, a number of structures and techniques have been devised for "distributing" lubricant along the length of the conduit as the electrical cable(s) is being pulled through the conduit. In general such prior art techniques have not provided an optimum balance between cost, simplicity and practicality. Effective, metered application of the lubricant along the conduit in a manner that selectively and reliably deposits more lubricant at those portions of the bends in the conduit where such lubricant is most needed has long been desired in the industry. While the greatest pulling tension-contributing force at a bend in a conduit is derived from engagement between the cable and that conduit wall defining the inner radius of the bend, most prior art lubricant spreaders fail to adequately or consistently apply metered amounts of lubricant to such inner radius conduit wall, thus failing to apply the lubricant where it is essentially needed. Further, the prior art conduit lubricant spreader devices generally do not provide for precise metered application of the lubricant to the conduit so that precise amounts of lubricant can be inserted within the conduit in advance of the spreader so as to minimize lubricant waste, or alternatively, do not have the practical capacity for holding a sufficient amount of lubricant required for lubricating the entire conduit run. By way of example only, several prior art techniques that have been devised for lubricating the inside surfaces of conduit runs will be briefly described below.

U.S. Pat. No. 3,858,687 to Masarky et al, discloses a technique wherein thin, rupturable, lubricant-containing packets are adhesively secured to the pull-strand winch line in advance of the electrical cable. As the pulling cable frictionally engages the conduit sidewalls at conduit bends the increased pressure applied to the packets will cause them to rupture, thus dispensing their contents. This technique allows for little if any application of lubricant along straight conduit runs and does not uniformly and reliably lubricate all bends along the conduit. As a practical matter most of the packets would be ruptured and dispense their contents at the first conduit bend, leaving no lubrication for subsequent bends.

U.S. Pat. No. 4,108,279 to Marcell, discloses a lubricant "dispensing" device that holds the lubricant, and which is positioned in advance of the electrical cable being pulled through the conduit. The dispenser uses a piston assembly for ejecting lubricant out of an opening in the forward end of the dispenser. The device attempts to dispense more lubricant to the conduit in areas where the pulling tension is greatest. The structure is generally complex and impractical for commercial use, it being generally impractical for long conduit run applications due to its limited lubricant reservoir size. Further, since the device is responsive to pulling tension, which generally continually increases with the length of electrical cable within the conduit, the device will have a tendency to deposit proportionately "more" lubricant as it progresses down the conduit, regardless of the number of bends it traverses along the way. Furthermore, the device does not insure application of lubricant to that conduit wall defining the "inner" radius of a bend, but would appear to deposit more lubricant to that conduit wall defining the "outer" radius of the curve (i.e. where the lubricant is least needed).

U.S. Pat. Nos. 4,137,623 and 4,275,096 to Taylor, describe cartridge-type dispensers having lubricant impregnated porous material compressibly packed between an inner sleeve casing and a carrier. As pulling tension is applied to the cartridge via the pulling strand or cable, the absorbent material expands to engage the inner diameter of the conduit, applying lubricant coating to the walls of the conduit. This type of lubrication structure is generally too complex and expensive to be commercially practical, has potentional reliability problems due to the number of moving parts involved for its operation, does not lend itself to large commercial application due to its small lubricant reservoir and does not effectively provide for increased lubrication at the conduit bends, as previously discussed.

U.S. Pat. No. 3,595,636 to Honeycutt, Jr., while not a lubricating device per se, describes an applicator for applying a protective coating to the inside surface of a generally straight, short section of pipe. The applicator has an exterior surface having longitudinal grooves and has generally flexible sidewalls to accommodate imperfections in the pipe. The device is not intended for use in cable pulling operations but is "pushed" through the pipe with compressed air or gas forced through the pipe from behind the applicator. This type of structure would generally be ineffective as an applicator for electrical cable pulling operations and would be ineffective for selectively applying more lubrication at bends in the conduit, as discussed above.

U.S. Pat. No. 4,296,837, previously referenced, in addition to the collar assembly for lubricating the electrical cable itself, also discloses a spray lubrication device that preceeds the electrical cable through the conduit. The spray device is supplied with lubricant fluid through a hose which extends from the exit of the conduit, the entire length of the conduit. This type of pump system is generally impractical for use by the average electrical contractor, is cumbersome to use due to the necessity of the long supply hose and supply pumps and does not automatically provide for selective additional lubrication to the conduit at the locus of its bends.

A simple prior art spreading structure that has been used for metering and applying a lubricant gel to the inside of the conduit has been a cylindrical rubber grommet having an outer diameter generally equal to that of the inner diameter of the conduit, and having a plurality of longitudinally peripherally extending grooves. The pulling cable passes through an axially aligned hole in the grommet, and the grommet is pulled along with the pulling cable through the conduit. A mass of lubricant is deposited within the conduit immediately preceeding the grommet, which pushes the lubricant before it through the conduit and applies the lubricant to the inner walls of the conduit as the lubricant passes through the outer grooves of the grommet. While this device is generally effective for metered lubrication of "straight" conduit runs, it does not effectively apply lubricant at the bends of the conduit. As the pulling cable progresses around a bend in the conduit, the cylindrical grommet is deformed under the pulling tension (in the radial direction) of the pulling cable, causing the grommet to actually wipe lubricant from that portion of the conduit forming the inner radius of the bend (i.e. where the lubricant is needed most) and causing it to apply excess amounts of lubricant to that portion of the conduit forming the outer radius of the bend (i.e. where the lubricant is least needed).

Therefore, while the electrical cable pulling industry has recognized the need for an effective spreading device for distributing lubricant within a conduit, and while the prior art structures developed to handle the problem have gone to great pains in developing intricate, complex and expensive assemblies for dealing with the situation, no single device has provided a simple, effective, reliable solution that can provide both adequate material distribution over long conduit runs and that can accurately and reliably deposit additional quantities of lubricant to the inside (or shorter) radius surface of the conduit at and just before bends in the conduit, where such lubricant is most needed. The present invention provides a simple, cost-effective method and apparatus that solves the above-described shortcomings of prior art lubricant spreading techniques and structures. The lubricant spreader of this invention is simple to use and is of rugged construction, involving no intricate moving parts, provides for positive and uniform metered application of lubricant along straight runs of conduit and consistently applies additional lubricant, exactly where the lubricant is most needed, to the inner (shorter) radius wall of the conduit at and just before a bend in the conduit. Due to its reliable metering property, the present invention allows the user to accurately determine the precise amount of lubricant that will be needed for any particular cable pulling project, preventing waste of the lubricant and undue clean-up of excess lubricant at the conduit outlet port.

SUMMARY OF THE INVENTION

The invention incorporates both an improved method for lubricating the inner wall of a conduit through which electrical wires are to be pulled, as well as a lubricant spreading apparatus for effecting the improved spreading process technique. In its most general sense, the invention includes a method of lubricating the inner surface of a conduit having at least one bend, preparatory to pulling a length of cable through the conduit, comprising the steps of: (a) uniformly applying metered amounts of lubricant to the inner walls of a conduit along straight portions of the conduit; and (b) applying proportionately larger amounts of the lubricant than is applied in step (a) to the shorter radius inner wall surface of the conduit at a bend in the conduit. The improved method also applies proportionately larger amounts of the lubricant to that inner wall of the conduit which forms a longitudinal extension of the shorter radius inner wall, immediately adjacent to and preceeding the bend. Therefore, the lubricating method of this invention provides for uniform lubrication of the conduit along its entire length, with additional amounts of lubricant, deposited in a reliable selective manner, at and immediately preceeding the bends of the conduit, and to the wall of the conduit against which the pulled cable will rub (i.e. that wall having the shorter radius of curvature at the bend). According to a preferred method of applying the lubricant to the conduit surface, the lubricant is applied in metered fashion, in longitudinally extending, circumferentially spaced strips of lubricant.

The basic method of lubricating the inner surface of a length of conduit having circular cross-section and at least one bend, and extending between inlet and outlet ports, comprises the steps of: (a) depositing a predetermined volume of lubricant into the inlet of a conduit; (b) inserting a lubricant spreading device of the type having a generally circular cross-section into the inlet of the conduit; (c) pulling the lubricant spreading device through the conduit from the inlet port to its outlet, thereby pushing the lubricant through the conduit before the spreading device; (d) uniformly applying metered amounts of the lubricant by the spreading device to the inner surface wall of straight portions of the conduit as the spreading device advances through the conduit; and (e) applying proportionately larger amounts of the lubricant by the spreading device to the shorter radius inner wall portion of the conduit at a bend in the conduit. The inventive method also provides for applying proportionately larger amounts of the lubricant to that inner wall of the conduit which forms a longitudinal extension of the shorter radius inner wall, immediately adjacent to and preceeding the bend (i.e. where the large sidewall tension forces are first developed between the cable being pulled through the conduit and the conduit walls). The inventive lubrication method further includes the step of simultaneously reducing the amount of lubricant applied to the longer radius inner wall surface of the conduit at a bend, as the proportionately larger amount of lubricant is being applied to the shorter radius inner wall portion of the conduit at that bend. Since the cable being pulled through the conduit generally does not engage such longer radius inner wall surface during the cable pulling operation, little or no lubricant is needed at that surface. The lubrication method is performed by a lubricant spreading device that is normally coaxially aligned with the conduit when being pulled through straight portions of the conduit, and which is caused to tilt or cock in the direction of curvature of the conduit at bends in the conduit, to effect the disproportionate lubrication application at the bends. The entire cable pulling operation in thus greatly facilitated by use of this method, which includes as its final step, the actual pulling of a cable through the conduit immediately after application of the lubricant to the inside surface of the conduit.

The lubricant spreading method of this invention is enabled by the unique construction of a lubricant spreading apparatus that is pulled through the conduit. According to a preferred construction, the lubricant spreading apparatus comprises: (a) a lubricant spreading member of generally circular cross-section, having leading and trailing ends and sized for operative coaxial insertion within a conduit, wherein the spreading member has outer surface means configured for peripherally engaging the inner wall of the conduit around the circumference of the inner wall when the spreading member passes coaxially through the conduit; and (b) means on the spreading member for metering lubricant of predetermined thickness onto the inner conduit wall when the spreading member moves coaxially within the conduit, and for selectively increasing the thickness of the metered lubricant applied to that wall of the conduit toward which the leading end of the spreading member tilts when the spreading member is cocked out of coaxial alignment with the conduit. In a preferred construction of the spreading apparatus, the spreading member is coaxially mounted to a portion of the pull strand or cable, which applies radial tilting forces to the spreading member to effect its proper operation. In its preferred configuration, the spreading member is generally in the shape of a frustum of a right circular cone, tapering toward the leading end of the spreading member, and the metering means comprises a plurality of axially extending rib portions circumferentially spaced around the outer periphery of the spreading member. According to a preferred construction, the upper surfaces of the rib portions are angularly disposed with respect to the outer surface of the frusto-conical section of the spreader. The preferred range of this angle, as measured in the direction toward the leading end of the spreading member lies in the range of about 3 to 20 degrees, with the most preferable range lying approximately between 5 to 10 degrees. According to its preferred construction, the spreading member is made of rubber; however, it will be understood that other semi-rigid but resilient materials can equally well be used. According to a preferred configuration of the spreading device, the trailing end of the spreading device comprises a cylindrical portion which engages that inner conduit wall having a larger radius at a bend, to wipe excess lubricant from that wall portion, thereby helping to redistribute that lubricant toward the wall having the shorter radius, where it is most needed.

While the invention will be described with reference to a particular configuration, shape and size of a spreading member, it will be understood that such configuration, shapes and sizes can be varied within the broad scope of this invention. In particular, while a frustoconical shaped spreader member is illustrated, it will be understood that other shapes could be used that would equally well perform the tilting function for selectively metering lubricant to the conduit before and at bends of the conduit. Further, while the lubricant spreading device described in the preferred embodiment will illustrate particular preferred angles for the conical section and for the peripheral raised rib portion, it will be understood that other angles could equally well be used to effect the desired spreader tilt and metering properties of the invention. Further, while one of the embodiments illustrated and to be described hereinafter depicts the lubricant spreading device as having a hollowed-out construction, it will be understood that this configuration is not necessary to the claimed invention, the primary constraint in this regard being that the spreading member have sufficient mass and rigidity adjacent its leading end to withstand (i.e. to avoid collapsing) the radial sidewall pressures exerted by the tension in the pulling cable during a pulling operation. Similarly, while particular dimensions will be illustrated for the raised rib portions of the lubricant spreader, such dimensions can be varied to effect the desired lubricant metering results, but must have sufficient structural rigidity so as not to collapse under the radial sidewall forces that will be typically applied to the rib members for the particular cable pulling operation to which the spreading member will be put. These and other variations of the invention will become apparant to those skilled in the art, in light of the following description of preferred embodiments of this invention.

BRIEF DESCRIPTION OF THE DRAWING

Referring to the Drawing, wherein like numerals represent like parts throughout the several views:

FIG. 4 is an axial sectional view of the lubricant spreader of FIG. 1, illustrating the spreader in operative position within a conduit and approaching and adjacent to a curved portion of the conduit;

FIG. 5 is an enlarged cross-sectional view generally taken along the line 5—5 of FIG. 4;

FIG. 6 is a side elevational view of an alternate embodiment construction of a lubricant spreading and metering device embodying the principles of this invention;

FIG. 7 is an axial sectional view of the lubricant spreader of FIG. 6;

FIG. 8 is an illustration of a lubricant container for facilitating handling and placement of lubricant into a conduit; and FIG. 9 is an enlarged fragmentary view of that portion designated at "A" of the view illustrated in FIG. 4, illustrating the spreading and metering device tipped at an even greater angle than that illustrated in FIG. 4.

DESCRIPTION OF THE PREFERRED EMBODIMENTS

This invention provides an improved method and apparatus for reliably, simply, and consistently applying uniform, metered amounts of lubricant to the inner walls of a conduit, preparatory to the actual pulling of cables through the conduit. A preferred application for the method and apparatus of this invention is for the pulling of electrical cables through a conduit. Such electrical cables may be in the nature of small electrical conductors for residential wiring applications, in the nature of numerous telephone lines being pulled through extended lengths of underground conduit; or in the nature of extremely large conductor cables being pulled through large (5 inch to 6 inch diameter) conduits in power plants. As previously mentioned in the Background portion of this specification, in all such applications it is desirable to "uniformly" lubricate the conduit through which the wires will be pulled, along its "straight" portions, and to apply proportionately larger amounts of lubricant to the conduit surfaces at its "bends". The amount of lubricant applied to the bend portions of the conduit should be preferably 2 to 4 times that applied to the conduit along one of its "straight" segments. Further, as stated above, the only wall of the conduit which needs the lubrication at a bend in the conduit is that wall having the shorter radius, since it is against that wall portion that the pulled cables will frictionally drag most as they are pulled through the conduit.

The lubricant spreading member of this invention is a "passive" member designed for simplicity. The spreader has no moving parts to reduce reliability, can easily be configured or molded at cost-effective prices to fit all standard sized conduits, and is of rugged construction to enable repetitive use over extended periods of time. The spreader is "passive" in the sense that it is configured to "respond" to forces applied to it by the pulling cable during a cable pulling operation. Such response is in the nature of a tilting or cocking of the spreader within the conduit at appropriate times during the pull (i.e. just before and during its passage through bends in the conduit). With this responsive constraint in mind, the shape and structural rigidity of the spreader has been configured so as to apply lubricant in such cocked position, without undue deformation, to exactly those portions of the conduit most in need of it, and in metered quantities predetermined to be sufficient to adequately counteract the extreme sidewall forces applied to the pulled cables as they pass through the conduit bends.

Figure 1:
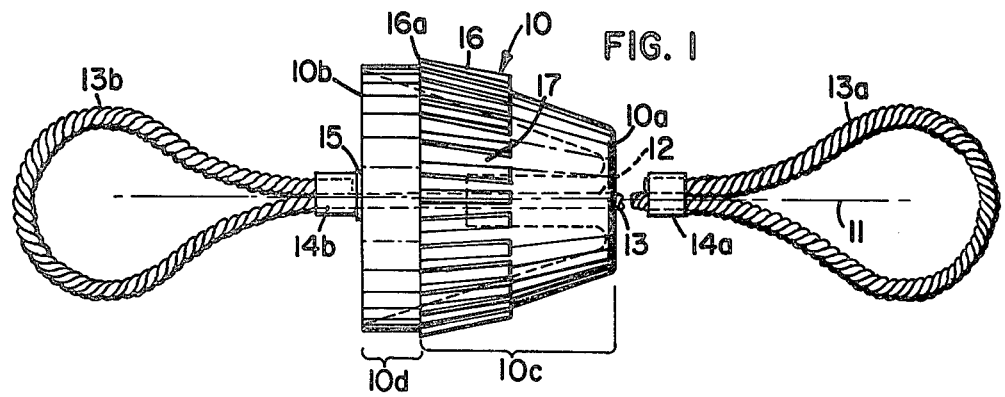
FIG. 1 is a side elevational view of a preferred embodiment construction of a lubricant spreading and metering device of this invention.

A preferred configuration of a lubricant spreader and metering member constructed according to the principles of this invention is illustrated at 10 in FIGS. 1-5 of the drawing. Referring to FIG. 1, the spreader 10 is symmetrically configured about an axis 11, and defines an axial passageway 12 formed therethrough for receiving a portion of a pulling cable 13. The pulling cable 13 extends through the axial passageway 12 of the spreader 10 and is swaged at its forward and rearward ends respectively terminating at loops 13a and 13b. The free ends of the swaged cable 13 are compressively, frictionally crimped by copper retaining members 14a and 14b. A washer 15 is inserted between the rearward copper retaining member 14b and the spreader member 10, for transmitting forces from the pulling cable 13 to the spreader member 10, to "pull" the spreader member 10 through a conduit, as hereinafter described in more detail. The cable 13 is illustrated in FIG. 1 in a nonoperative position.

The lubricant spreader and metering member 10 is preferably constructed from a semi-rigid but somewhat resilient, durable material. In the preferred construction, rubber having a hardness of 85 as measured on the Shore A scale has been found to function well for this purpose. As previously stated, although the preferred construction of the spreader 10 is of rubber, it will be understood that other resilient materials could also be used, as long as the material has sufficient flexibility to permit the spreader 10 to conform to irregularities or dents in a conduit through which it will be passed, and also has the structural rigidity required to withstand the significant sidewall forces to which the spreader will be subjected during a cable pulling operation, as hereinafter described in more detail.

The lubricant spreader 10 generally extends from a forward or leading end 10a to a trailing end 10b, such ends being termed with respect to the direction in which the spreading member progresses along a conduit. In the preferred construction, the spreader member 10 is of unitized molded construction. The forward portion of the spreader (generally indicated at 10c) is in the shape of a frustum of a right circular cone, symmetrically disposed about the axis 11. The rearward portion of the spreader (generally designated at 10d) is of generally cylindrical configuration, and suitable for laterally deforming and conforming in response to forces applied by the conduit walls thereto when the spreader 10 is tilted or cocked within a conduit, as hereinafter described. The inner portion of the spreader 10 is hollowed-out, as indicated in more detail in FIG. 2, and includes a cylindrical abutment member 10e rearwardly coaxially extending within the spreader 10 and terminating at an annular bearing surface 10f. A plurality of raised rib members 16 are circumferentially spaced around the outer perimeter of the frusto-conical portion 10c of the spreader and longitudinally extend forward from the rear cylindrical portion 10d of the spreader to a position spaced back from the leading end 10a of the spreader. In the preferred construction, the upper (i.e. radially outwardly facing) surfaces of the rib members 16 are generally planar and radially extend upward, above the outer surface of the rearward cylindrical portion 10d and above the conical surface of the frusto-conical portion 10c of the spreader. The upper surfaces of the rib members 16 are configured to slideably engage the inner wall or surface of a conduit during a lubricant applying process, as hereinafter described in more detail.

Figure 2:
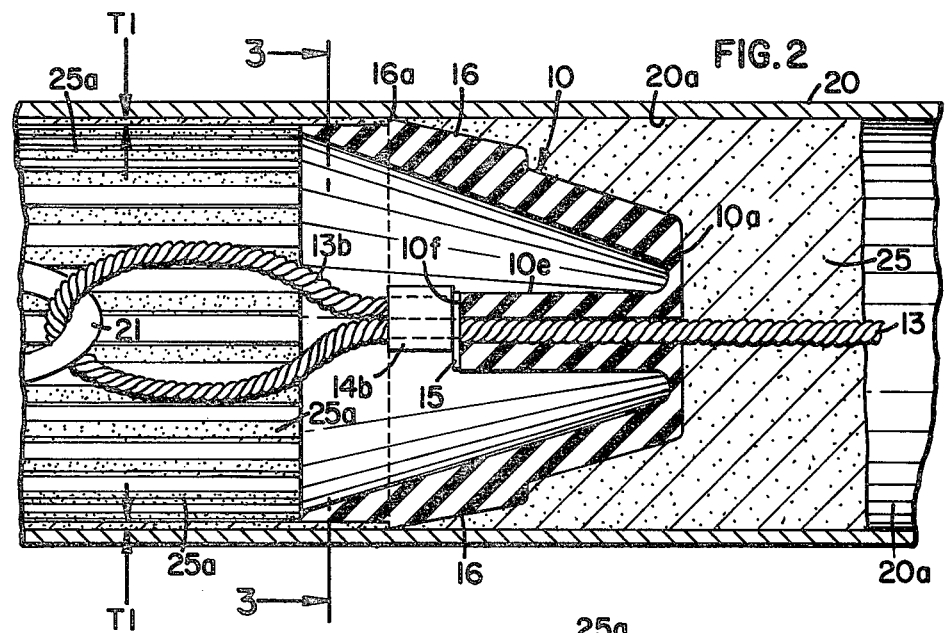
FIG. 2 is an axial sectional view of the lubricant spreader of FIG. 1, illustrating the spreader in operative position within a straight portion of conduit.

The outer surfaces of the rib members 16 are inclined at an angle to the other surface of the frusto-conical portion 10c of the spreader, as illustrated in FIG. 2. The frusto-conical surface portions lying between adjacent ones of said raised rib members 16 define land areas or grooves, generally designated at 17. The raised rib members 16 direct lubricant through the grooves 17 for application to the inner walls of a conduit, in metered fashion, as hereinafter described. The depth of the grooves 17 (or alternatively the height of the rib members 16) can vary depending upon the desired thickness of lubricant to be applied to a conduit wall. The rib member height will also be determined in part by the percent of deformation of the ribs when radial sidewall forces are applied thereto. This factor is determined in part by the consistency of the material from which the spreader is constructed, as well as by the width and cross-sectional shape of the rib members. In this regard, the rib width versus spacing ratio can also be adjusted to suit the design constraints. In the preferred construction, the widths of the rib members and their adjacent grooves are the same. In the preferred construction, the rib member height dimension at its trailing end is approximately 0.0625 inches, but foreseeably can be reduced down to 0.005 inches, if only a minimal amount of lubricant deposition is desired.

The angle that the frusto-control section (10c) surface forms with the central axis 11 is also a matter of design choice, and will be determined by a combination of the extent to which the spreader member 10 is designed to tilt or rock within a conduit, as well as a function of the length of the spreader member. A preferred range for this angle is approximately 10 to 30 degrees, and more preferably lies within the range of 15 to 20 degrees. Similarly, the angle formed between the upper or outer surface portions of the rib members 16 and their intermediate and land areas 17, as measured in the direction toward the leading end of the spreading member preferably will lie in the range of approximately 3 to 20 degrees and more preferably within the range of approximately 5 to 20 degrees. Again, determination of the rib inclination angle is a function of a number of design constraints, including the length of the rib members 16, the relative length of such rib members compared to the set-back of their leading edges from the leading end 10a of the spreader member, the overall length of the spreader member itself, and to the amount of lubricant that is desired for deposition at a bend in the conduit.

The spreader 10 is illustrated in FIG. 2 as it would operatively appear when spreading lubricant within a "straight" section of conduit, generally indicated at 20. In such position, the pulling cable 13 is under tension. The forward loop 13a of the cable is connected to a pull strand which line (not illustrated) which in turn is generally connected to a winch mechanism (not illustrated). The trailing loop 13b of the cable 13 is connected by means of a clevis to a cable pulling basket (a portion of which is generally indicated at 21) which is secured to the leading ends of the cables to be pulled through the conduit 20. A predetermined amount of lubricant 25, which is to be spread along the inside surface of the conduit, is disposed forward of the spreader 10 and is pushed through the conduit by the spreader. When the cable 13 is under tension, the mass of the lubricant 25 will force the spreader member 10 background along the cable 13 until the bearing surface 10f of the cylindrical abutment member 10a forceably engages and sandwiches the washer 15 between the bearing surface 10f and the retaining member 14b. Thereafter, as the cable 13 is pulled through the conduit 20, the spreader 10 will be "pushed" in advancing motion down conduit 20 by the retaining member 14b.

The lubricant 20 is preferably of a light gel having excellent smooth-coating properties and good lubricity. Those skilled in the art will be familiar with various types of such lubricants commonly used. However, other lubricants are suitable for use with the spreader 10, the primary limitation to the use of a lubricant being that it is of a consistency sufficient to flow through the grooves 17 between the ribs 16 and to adhere to the inner surface area 20a of the conduit 20, while performing the desired lubrication function.

Figure 3:
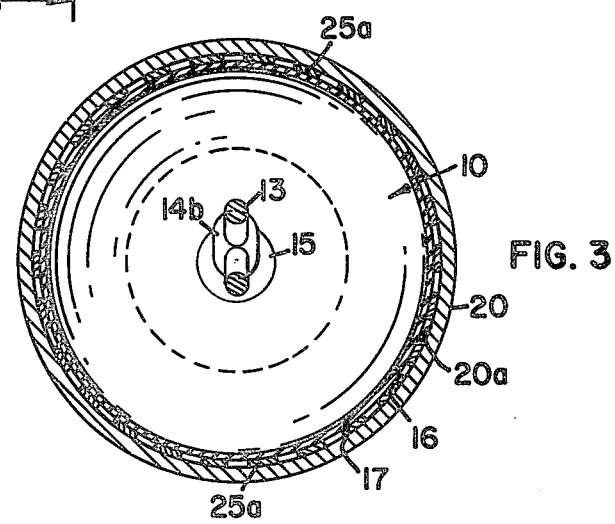
FIG. 3 is an enlarged cross-sectional view generally taken along the line 3—3 of FIG. 2.

Referring to FIG. 2, when the spreader member 10 is being pulled through a "straight" section of the conduit 20, the pulling cable 13 will be generally coaxially aligned with the conduit 20, causing the spreader 10 to also be coaxially aligned within the conduit. Under such conditions, the spreader member 10 is pulled concentrically through straight sections of the conduit 20. When disposed in such orientation, only the "rear" portions 16a of the outer surfaces of the rib members 16 slidably engage and contact the inside surface 20a of the conduit 20. Referring to FIG. 3, it will be noted that when disposed in such coaxial manner within the conduit 20, the peripheral rib members 16 uniformly meter and cause the lubricant 25 to pass through the grooves 17 and to be applied in longitudinally extending "strips" 25a of lubricant as the spreading member 10 progresses down the conduit. The thickness of the metered lubricant deposited in the lubricant strips 25a is of uniform thickness T1 (see FIG. 2) around the entire inner peripheral surface of the conduit 20a. In practice, due to the wall effect interaction between the lubricant 25 and the walls defining the grooves 17 as the lubricant passes therethrough, the actual lubricant thickness deposited on the inner surface 20a of the conduit 20 will be approximately 60 percent of the actual groove dimensions. Accordingly, when there is no curvature of the conduit, the spreader 10 will uniformly and evenly distribute lubricant in longitudinal strips around the entire periphery of the inner conduit wall.

FIGS. 4 and 5 illustrate the manner in which the spreader 10 operates when approaching and traversing a curvature or bend in the conduit. As the pulling cable 13 is pulled around a bend (generally designated at 20b in the conduit 20), the cable 13 shifts from its coaxial alignment within the conduit, toward the direction of curvature, and eventually into direct engagement (as illustrated in FIG. 4) with that wall 20a1 of the conduit, having the shorter bend radius. For ease of reference, that portion of the inner wall 20a of conduit 20 which extends around the lower half (as illustrated in FIG. 4) of the conduit and which has the shorter bend radius will be referred to as 20a1; whereas the upper one-half portion of the conduit inner surface, having the longer bend radius will be referred to as 20a2.

As the cable 13 radially moves out of coaxial alignment with the conduit, such movement transmits a radial force in the direction of curvature of the conduit, to the leading end 10a of the spreader member 10. This radial force vector (comprising a portion of the cable pulling tension force) causes the spreading member 10 to tilt in the direction of the approaching curvature, as indicated in FIG. 4. As the spreader 10 advances to a non-concentric or tilted position within the conduit 20, the outwardly disposed surfaces of the lowermost rib members 16 will come into sliding engagement with the lower inner conduit surface 20a1, to an extent as determined by the degree of tilting of the spreader 10. As the spreader tilts, the uppermost rib members 16 will disengage from contact with the upper inner cylindrical wall portion 10a2 (see FIG. 4) and the trailing cylindrical portion 10d of the spreader member will deform to uniformly engage the upper conduit surface 20a2. Ideally, the tilting forces exerted upon the spreader 10 will allow the spreader tilting action to stop at a position as generally indicated in FIG. 4, wherein the outer surfaces of the lowermost rib member 16 are in full sliding engagement with the lower conduit surface 20a1. However, it is feasible that the tilting forces exerted on the spreader 10 could be sufficiently large so as to cause the spreader to tilt even further, creating a rib engagment situation as illustrated in enlarged view in FIG. 9.

As the cable 13 is further advanced, the spreader 10 slides through the conduit 20 and bend 20b in its tilted or cocked position as illustrated in FIG. 4. In such position, the tilting action increases the gap or distance in the radial direction between the bottom of a groove 17 and the conduit surface 20a1, causing a correspondingly "thicker" strip of lubricant 25a to be deposited on the conduit surface 20a1. Simultaneously, the uniform engagement of the trailing cylindrical portion of the spreader 10d against the upper conduit surface 20a2 provides a controlled wiping action of the upper surface 20a2, allowing little if any of the lubricant 25 to be deposited on the upper conduit surface 20a2. Referring to FIG. 4, the thickness of the lowermost strip 25a of lubricant deposited on the lower surface 20a1 has been designated as T2. For purposes of comparison, the thickness of the lubricant T2 deposited on surface 20a1 will typically be 2 to 4 times that of the thickness T1 of lubricant deposited on the walls of a straight portion of the conduit. The actual distribution gradient of lubricant thickness that is applied to the conduit walls when the spreader is tilted as illustrated in FIG. 4, is more graphically depicted in FIG. 5. Referring thereto, it will be noted that the thickest lubricant deposition appears at the lowermost portion of the conduit surface 20a1 (i.e. that portion of the conduit having the smallest radius). The thickness of the deposited lubricant gradually decreases as the upper surface 20a2 of the conduit 20 is approached, until the uppermost portion of the conduit surface 20a2 is reached, at which point the lubricant coating deposited is minimal.

It can be appreciated, therefore, that since the wires being pulled by the pulling basket 21 will generally follow the same path as that of the pulling cable 13, they will follow and frictionally engage the lower conduit surface 20a1 as they are pulled around the curvature or bend 20b of the conduit. Any engagement of these cables with the upper conduit surface 20a2 will be minimal. It is apparent, therefore, that operation of the spreader 10 when approaching and progressing through a curved section of conduit, applies the lubricant 25 exactly where it is needed most to assist the subsequent cable pulling operation (i.e. to those walls of the conduit having the shortest radius). It is also significant to note that the tilting action, and therefore the selective increased lubricant deposition process appears well before the actual curvature or bend in the conduit, thereby "anticipating" the eventual path of the electrical wires or cables that will be pulled through the conduit, and providing lubrication to the conduit surfaces that will be directly imparting the most severe sidewall forces to the cable.

It will be appreciated that while rib members 16 having generally rectangular cross-sectional shapes have been disclosed for use in association with the spreader 10, that other cross-sectional rib configurations could equally well be used. The spreader member 10 of the preferred embodiment deposits the lubricant in longitudinally extending strips. It has been found that such strips of lubricant are just as effective in reducing frictional resistance to pulling wires through a conduit as is a continuous film of lubricant applied to the inside surface of the conduit. It will also be appreciated that while a swaged cable 13 has been illustrated as providing the force-imparting medium to the spreader 10, that a rigid rod, such as a steel rod with looped ends, could also be used for such purposes. If such a steel rod were used, however, its length would have to be sufficiently short to enable ready passage of the rod through the conduit and around bends in the conduit, without imparting damage to the inner surfaces of the conduit.

An alternate embodiment of a spreader member 10' constructed according to the principles of this invention is illustrated in FIGS. 6 and 7. Referring thereto, wherein primed designations refer to similar portions of the spreader member previously described with respect to the first embodiment of the invention, the general exterior shape of the spreader 10' is similar to that previously described with respect to the first embodiment. The forward portion is generally of frustoconical configuration and the trailing edge is of cylindrical, resilient construction. The rib members 16° are of similar construction to those ribs 16 of the first-described embodiment, but extend, at a reduced height, to the leading end 10a' of the spreader 10'. The primary difference between the structural configuration of the spreader illustrated in FIGS. 6 and 7 is that the mass of the spreader 10' is of more "solid" configuration, as opposed to the "hollowed-out" construction of the spreader member 10 previously described.

Use of a spreader member constructed according to the principles of this invention greatly facilities cable pulling operations. The steps required to perform the cable pulling operation are simple. A predetermined volume of lubricant is inserted into an inlet port of a conduit. The lubricant spreading device is then pulled into engagement with the lubricant and through the conduit from the inlet port to its outlet port. The electrical cables to be pulled through the conduit are directly connected to the cable basket 21 connected to the trailing loop of the pulling cable 13b. As the spreading member progresses through a conduit it automatically applies metered amounts of lubricant uniformly around the inner peripheral surface of the conduit over straight portions of the conduit, and applies proportionately larger amounts of lubricant around and preceeding the curvatures in the conduit, by applying such lubricant primarily only to that portion of the conduit having the shorter bend radius.

Use of the method and lubricant spreading apparatus of this invention not only facilitates the actual pulling of cables through the conduit, but avoids significant waste of the lubricant itself, by enabling the user of this invention to accurately calculate and predict the amount of lubricant that will be needed to complete a pulling operation. This is a direct result of the lubricant application metering properties of the invention. The lubricant can be inserted into the conduit in any manner well known in the art, either manually, via pumps, or the like. A convenient method that has been found to be particularly helpful by the inventor is to apply lubricant to the conduit from a lubricant containing sack or tube generally illustrated at 30 in FIG. 8, having predetermined section marks 32 thereon indicating the amount of lubricant contained between respective section marks. The section marks can be callibrated to denote the exact amount of lubricant to be used for a specified length and diameter of conduit. The metering tube 30 would typically comprise a polyethylene tube or the like, having closures 34 on each end, with the lubricant contained therein. The operator merely cuts the metering tube 30 to corresponding to the length of conduit to be lubricated and empties the contents of the tube 30 into the conduit, preceeding the spreading member 10. Due to the precise metering nature provided by this invention, the operator is assured that such predetermined amount of lubricant will suffice to properly lubricate the conduit for his particular application.

From the foregoing description, it will be appreciated that the present invention solves many of the problems and shortcomings of prior art methods and structures for spreading lubricant within a conduit. It will be understood that while specific configurations of lubricant spreading devices that satisfy the intent of this invention have been disclosed herein, other variations of such spreading devices can be conceived by those skilled in the art. Other modifications of the invention will be apparant to those skilled in the art in view of the foregoing descriptions. These descriptions are intended to provide specific examples of individual embodiments which clearly disclose the present invention. Accordingly, the invention is not limited to the described embodiments or to use of the specific elements or configurations contained therein. All alternative modifications and variations of the present invention which fall within the spirit and broad scope of the appended claims are covered.

I claim:

1. A method of lubricating the inner surface of a conduit having at least one bend, preparatory to pulling a length of cable through said conduit, comprising the steps of:
   (a) uniformly applying metered amounts of lubricant to the inner walls of a conduit along straight portions of said conduit; and
   (b) applying proportionately larger amounts of said lubricant than is applied in step (a) to the shorter radius inner wall surface of the conduit at a bend in said conduit.

2. The method of claim 1, wherein the proprotionately larger amounts of said applied lubricant of step (b) comprise metered amounts of said lubricant.

3. The method of claim 1, further including the step of applying proportionately larger amounts of said lubricant to that inner wall of conduit that forms a longitudinal extension of said shorter radius inner wall, immediately adjacent to and preceeding said bend.

4. The method of claim 1, including the step of applying less lubricant than is normally applied in step (a) to the longer radius inner wall surface of the conduit at a bend in said conduit.

5. A method of claim 1, wherein said lubricant is applied to the inner surface of said conduit in longitudinally extending circumferentially spaced strips of said lubricant.

6. The method of claim 1, further including the step of pulling a cable through the conduit immediately after application of the lubricant to the inner surface of the conduit.

7. A method of lubricating the inner surface of a length of conduit having circular cross-section and extending from an inlet port to an outlet port and having at least one bend, comprising the steps of:

(a) depositing a predetermined volume of lubricant into an inlet port of a conduit;

(b) inserting a lubricant spreading device of a type having a generally circular cross-section into the inlet port of the conduit;

(c) pulling the lubricant spreading device through the conduit from said inlet port to its outlet port, thereby pushing said lubricant through said conduit before said spreading device;

(d) applying metered amounts of said lubricant to the inner surface wall of straight portions of said conduit by said spreading device as it advances through said conduit; and (e) applying proportionately larger amounts of said lubricant by said spreading device to the shorter radius inner wall portion of said conduit at a bend in said conduit.

8. The method of claim 7, including the step of applying proportionately larger amounts of said lubricant to that inner wall of said conduit that forms a longitudinal extension of said shorter radius inner wall, immediately adjacent to and preceeding said bend.

9. The method of claim 7, wherein the step of applying proportionately larger amounts of said lubricant to the shorter radius wall at a bend in said conduit comprises the step of applying metered amounts of said proportionately larger amount of said lubricant.

10. The method of claim 7, including the step of simultaneously reducing the amount of lubricant applied to the longer radius inner wall surface of the conduit at said bend as the proportionately larger amount of said lubricant is being applied to said shorter radius inner wall portion of said conduit at that bend.

11. The method of claim 7, wherein said lubricant spreading device is normally aligned coaxially with said conduit when passing through straight sections of said conduit and is caused to cock in the direction of curvature of said conduit bend when applying said proportionately larger amount of lubricant to the shorter radius wall.

12. The method of claim 7, wherein said lubricant spreading device is normally aligned coaxially with said conduit when passing through straight sections of said conduit and is caused to cock in the direction of curvature of said conduit bend when applying said proportionately larger amount of lubricant to said inner wall of said conduit that forms a longitudinal extension of said shorter radius wall.

13. The method of claim 7, including the step of circumferentially engaging the lubricant spreading device with the inner conduit wall surface as said spreading device is pulled through said conduit, and wherein said engagement is operatively maintained around the entire circumference of said spreading device even when said spreading device passes through bends in said conduit.

14. The method of claim 7, further including the step of pulling a cable through the conduit immediately after application of the lubricant to the inside surface of the conduit.

15. The method of claim 7, wherein said lubricant is applied by said lubricant spreading device to the inner surface wall of said conduit in longitudinally extending, circumferentially spaced strips of said lubricant.

16. The method of claim 15, wherein said lubricant spreading device is of a type having longitudinally extending grooves arounds its outer periphery, and wherein said lubricant longitudinally passes through said grooves in metered fashion and is forced into adhering contact with said inner conduit wall as said spreading device is pulled through said conduit.

17. A lubricant spreading apparatus for selectively metering lubricant onto the inner walls of a conduit according to the curvature of the conduit, comprising:

(a) a lubricant spreading member of generally circular cross-section, having leading and trailing ends and sized for operative coaxial insertion within a conduit; said spreading member having outer surface means configured for peripherally engaging the inner wall of the conduit around the circumference of said inner wall when said spreading member passes coaxially through said conduit; and (b) means on said spreading member for metering lubricant of predetermined thickness onto said inner conduit wall when said spreading member moves coaxially within said conduit, and for selectively increasing the thickness of said metered lubricant applied to that wall of said conduit toward which said leading end of said spreading member tilts when said spreading member is cocked out of coaxial alignment with said conduit.

18. A lubricant spreading apparatus as recited in claim 17, wherein said spreading member includes wiping surface means adjacent its trailing end for engaging that wall of said conduit toward which the trailing end of said spreading member tilts when said spreading member is cocked out of coaxial alignment with said conduit, to selectively decrease the amount of said metered lubricant applied to that wall.

19. A lubricant spreading apparatus as recited in claim 17, further including means for applying radial tilting forces to said spreading member as said spreading member is pulled through a bend in said conduit, said tilting forces causing the leading end of said spreading member to tilt in the direction of curvature of said conduit bend; whereby said spreading member applies said lubricant of increased thickness to that inner conduit wall having the shorter radius at the conduit bend.

20. A lubricant spreading apparatus as recited in claim 19, wherein said means for applying said radial tilting forces includes cable means coaxially extending through said spreading member, for pulling said spreading member through a conduit.

21. A lubricant spreading apparatus as recited in claim 20, wherein said cable includes looped connection terminals forward and rearward of said spreading member.

22. A lubricant spreading apparatus as recited in claim 17, wherein said metering means comprises a plurality of axially extending rib portions circumferentially spaced around the outer perihery of said spreading member, wherein said rib portions comprise in part said outer surface means.

23. A lubricant spreading apparatus as recited in claim 22, wherein a portion of said spreading member is generally in the shape of a frustum of a right circular cone, wherein the taper of said cone is from said trailing to said leading end of said spreading member.

24. The lubricant spreading apparatus as recited in claim 23, wherein the angle between said conical wall portions and the central axis of said spreading member lies in the range of approximately 10 to 30 degrees.

25. A lubricant spreading apparatus as recited in claim 24, wherein said angle between said conical wall portions and the central axis of said spreading member lies in the range of approximately 15 to 20 degrees.

26. A lubricant spreading apparatus as recited in claim 23, wherein said rib portions extend along said frusto-conical portion in a manner such that when said spreading member is coaxially aligned within a conduit, only the trailing portion of said rib portions engage the inner walls of said conduit; and wherein when said spreading member is tipped out of coaxial alignment with the conduit, a larger segment of those respective rib portions on that side of the spreading member toward which the spreading member is cocked come into engagement with the inner wall of said conduit.

27. A lubricant spreading apparatus as recited in claim 26, wherein said spreading member is constructed of semi-rigid, but resilient material.

28. A lubricant spreading apparatus as recited in claim 27, wherein said spreading member is made of rubber material.

29. A lubricant spreading apparatus as recited in claim 26, wherein the height of said rib portions above the land areas of the spreading member circumferentially spacing said ribs, increases in the direction from trailing to leading end of the spreading member; whereby the thickness of lubricant allowed to pass between said rib portions engaging the conduit wall in the direction of tilt of the spreading member is increased as compared to the thickness of lubricant allowed to pass between those same ribs when said spreading member is coaxially aligned with said conduit.

30. A lubricant spreading apparatus as recited in claim 29, wherein the angle formed between the upper surface of the rib portions and their intermediate land areas, as measured in the direction toward the leading end of the spreading member, lies in the range of approximately 3 to 20 degrees.

31. A lubricant spreading apparatus as recited in claim 30, wherein said angle formed between the upper surface of the rib portions and their intermediate land areas, as measured in the direction toward the leading end of the spreading member, lies in the range of approximately 5 to 10 degrees.

32. A lubricant spreading device for selectively spreading metered lubricant onto the inner wall of an electrical conduit according to the curvature of the conduit, comprising:
(a) a cylindrical portion defining a trailing end or the spreading device;
(b) a frusto-conical portion coaxial with and extending forward from said cylindrical portion, toward a leading end of the spreading device; said cylindrical and frusto-conical portions being shaped to define a passageway extending concentrically therethrough for accepting a pulling cable;
(c) a plurality of longitudinally extending raised rib members circumferentially spaced around the outer perimeter of said frusto-conical portion, said rib members having upper surface contact areas suitable for slidably engaging the inner wall of a conduit, and intermediate land areas between the ribs comprising in part the outer surface of said frusto-conical portion; and
(d) said spreading device being sized and configured for operation when pulled through a straight section of conduit in the direction of its leading end, to allow lubricant engaged by the spreader member in the conduit to pass between said raised rib members in metered fashion and to be deposited in circumferentially spaced longitudinal strips along the interior wall of the conduit, and when pulled through a curved section of the conduit, to radially tilt in the direction of curvature so as to selectively deposit larger metered amounts of lubricant to the conduit wall toward which the leading end of the spreader device is tilted, while applying less lubricant to the conduit wall to which the trailing end of the spreader device is tilted.

33. A lubricant spreading device as recited in claim 32, wherein the general plane of said upper surface contact areas of at least some of said ribs form an angle with the underlying surface of said frustoconical portion, wherein said angle when measured from trailing to leading ends of the spreader device lies in the range of approximately 3 to 20 degrees.

34. A lubricant spreading device as recited in claim 32, wherein the angle said outer wall portion of said frusto-conical section forms with the central axis of said spreader device lies in the range of approximately 10 to 30 degrees.

35. A lubricant spreading device as recited in claim 32, wherein the circumferential spacing between said raised rib members lies in the range of approximately 50% to 200% of the cross-sectional width of said ribs.

36. A lubricant spreading device as recited in claim 32, wherein said spreading member is made of rubber material.

* * * * *